Feb. 22, 1927.
A. F. O'CONNOR
1,618,218
DROP BRAKE MECHANISM
Filed Sept. 26, 1923    2 Sheets-Sheet 1
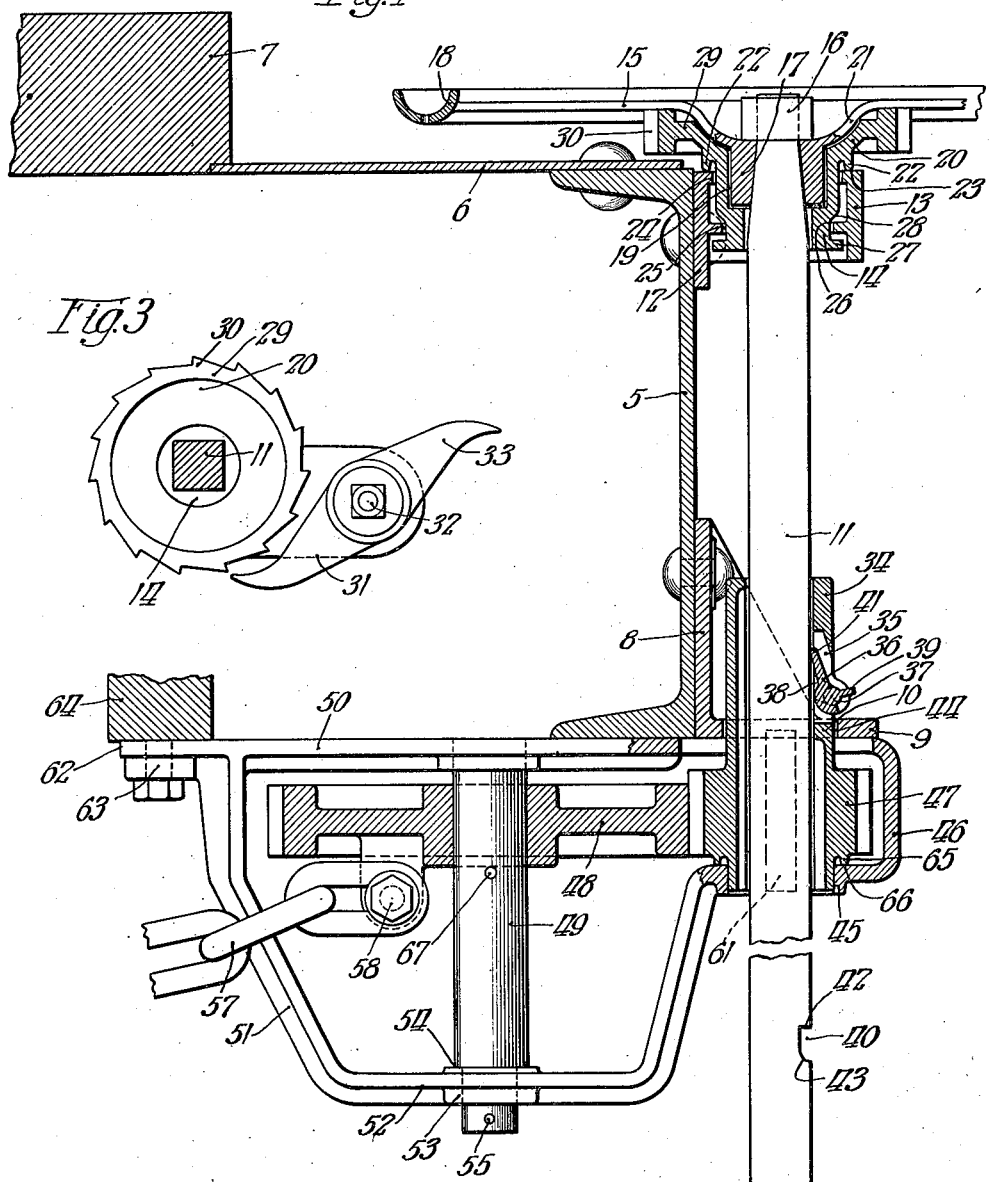
Inventor
Arthur F. O'Connor
By ... Atty.

Feb. 22, 1927.
A. F. O'CONNOR
1,618,218
DROP BRAKE MECHANISM
Filed Sept. 26, 1923    2 Sheets-Sheet 2
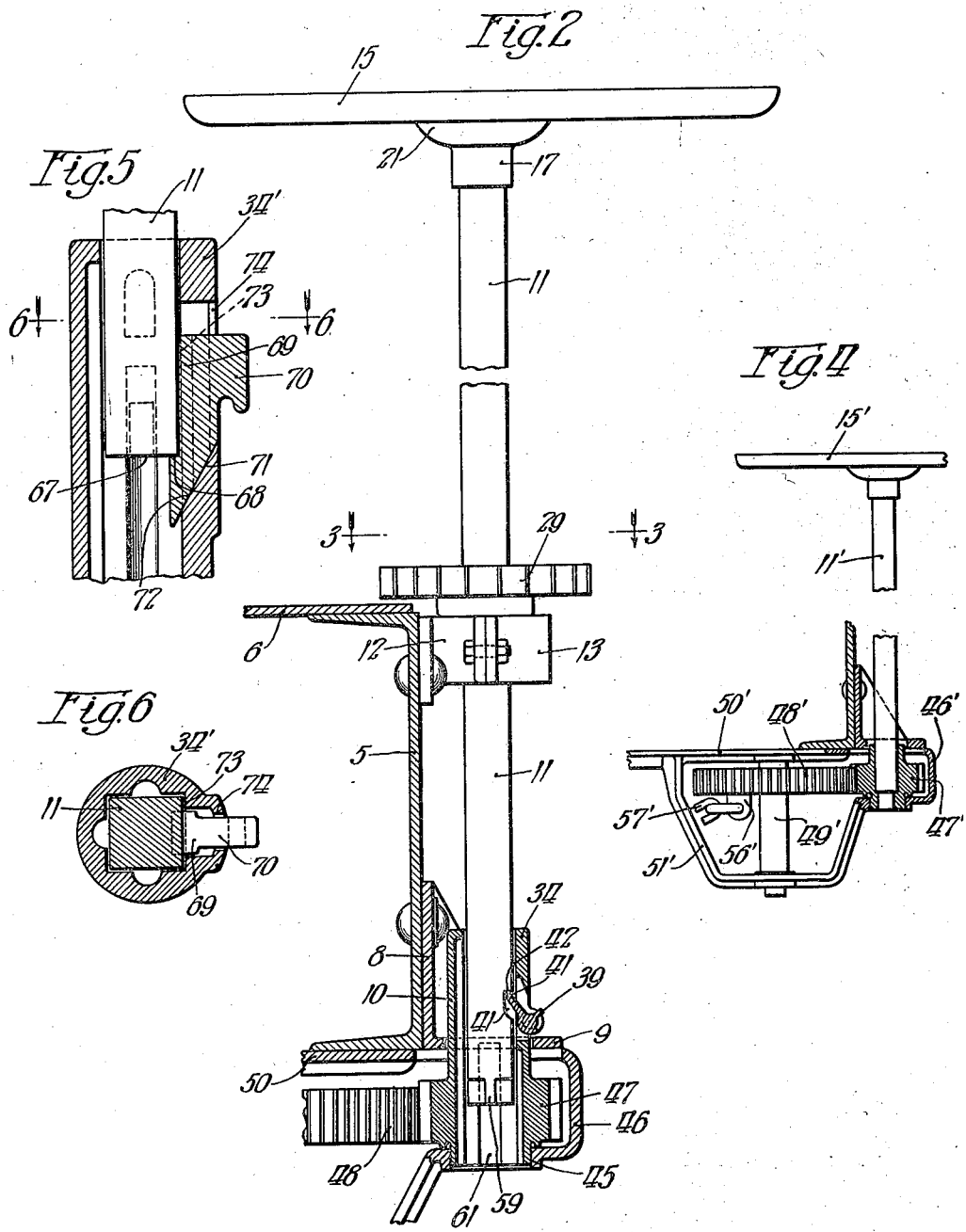
Inventor
Arthur F. O'Connor Patented Feb. 22, 1927.

1,618,218

UNITED STATES PATENT OFFICE.

ARTHUR F. O'CONNOR, OF CHICAGO, ILLINOIS, ASSIGNOR TO UNION RAILWAY EQUIPMENT COMPANY, OF CHICAGO, ILLINOIS, A CORPORATION OF ILLINOIS.

DROP BRAKE MECHANISM.

Application filed September 26, 1923. Serial No. 664,900.

My invention relates to drop brake mechanism and more particularly to a brake mechanism for flat cars having a hand wheel which is adapted to be depressed or elevated as desired.

It is a purpose of the invention to provide a brake mechanism comprising a shaft having a hand wheel thereon, which shaft, upon turning in one direction, winds a chain on a shaft or sleeve to apply the brakes, said shaft carrying the hand wheel being provided with independently mounted spaced bearings having sleeves therein which are adapted to rotate with the shaft in any position of the hand wheel, whereby said mechanism is adapted to be mounted on a car no matter what is the shape of the end sill.

It is a further purpose of the invention to provide a device of the above mentioned character which is simple in construction and which is easily operated due to the fact that the sleeve members are so mounted in the bearings as to reduce friction between the same as much as possible.

It is still a further purpose of the invention to provide a brake mechanism of the above mentioned character wherein the shaft carrying the hand wheel is provided with a pinion which meshes with a gear carried by the shaft upon which the flexible member for applying the brakes is wound so that the amount of power obtained by actuation of the hand wheel is multiplied in accordance with the relative size of the pinion and gear wheel.

It is another object of the invention to provide a brake mechanism wherein the slack in the chain is quickly taken up without the use of complicated mechanism.

Other objects and advantages of the invention will appear as the description of the accompanying drawings proceeds. However, I desire to have it distinctly understood that I do not intend to limit myself to the exact details shown or described but that I intend to include as part of my invention all such obvious changes and modifications of parts as would occur to a person skilled in this art and as would fall within the scope of the claims.

In the drawings:

Fig. 1 is a vertical section showing a portion of the car floor and the end sill of the car with my improved brake operating mechanism in position thereon;

Fig. 2 is a similar view partly in elevation and partly in section of the brake mechanism with the hand wheel in elevated position;

Fig. 3 is a section taken on the line 3—3 of Fig. 2;

Fig. 4 is a fragmentary vertical sectional view showing my winding mechanism applied to an ordinary hand brake;

Fig. 5 is a fragmentary sectional view of a modified form of locking means; and

Fig. 6 is a section thereof taken on line 6—6 of Fig. 5.

Referring in detail to the drawings, in Fig. 1 is shown a channel member 5 and a plate 6 forming the end sill of a car having the floor 7. Mounted on the channel member 5 is a bracket 8 having a laterally extending portion 9 provided with an opening for a sleeve 10 through which the shaft 11 extends. Said channel member 5 is also provided with a bracket member 12 having a cap member 13 providing a bearing within which the sleeve 14 is mounted and through which the shaft 11 also passes.

As will be clear from Fig. 3, the shaft 11 is square and the openings in the sleeves 10 and 14 are also square so that the shaft and sleeve will rotate together. Mounted on the upper end portion of the shaft 11 is a hand wheel 15 of any desired construction, said hand wheel being held in place by means of a nut 16 provided on the end of said shaft 11. The hand wheel is provided with an offset hub portion 17 so that the nut 16 and the end of the shaft 11 will not extend above the rim 18 of said hand wheel. The hub portion 17 extends within a socket 19 in the sleeve 14, said sleeve also having an upwardly extending portion 20 conforming substantially to the shape of the spokes 21 of the hand wheel 15 adjacent the hub 17 and having a downwardly extending rib or bearing portion 22 engaging the upper surface 23 of the bearing members 12 and 13. Said bearing members 12 and 13 are also provided with inwardly extending rib portions 24 at the upper ends thereof and with rib portions 25 which are adapted to enter the annular groove 26 in the sleeve 14, said annular groove being provided between the annular end flange 27 and the annular shoulder 28 on the sleeve 14.

It will be noted that the sleeve 14 fits loosely within the members 24 and 25. Thus substantially all the friction that exists between the members 13 and 14 is at the point where the rib 22 engages with the upper surface of the member 13. The sleeve 14 is provided at the upper end thereof with an outwardly extending portion 29 which is provided with ratchet teeth 30 forming a ratchet wheel co-operating with the pawl 31 pivotally mounted at 32, and having an extension 33 adapted to be engaged by the foot of the operator for moving the pawl into and out of holding position, this being the usual ratchet and pawl construction in brakes of this character.

It will be seen that due to the construction of the hand wheel 15 and the sleeve 14, the hand wheel will be positioned below the upper surface of the floor 7 when in depressed position. Said hand wheel can, however, be extended to the position shown in Fig. 2, this being accomplished due to the construction of the sleeve 10.

The sleeve 10 is provided with an upwardly extending portion 34, having an opening 35 in the side thereof into which the pivoted holding finger 36 is adapted to be placed by placing the same in the opening from the upper end portion of the sleeve 10. The member 36 is provided with a pair of lateral extensions or pivot members 37 which are adapted to enter the slots 38 as said member 36 is moved into its operative position. When the shaft 11 is inserted within the sleeve 10, the member 36 will be held in position thereby as the entrance to the slots 38 will be closed. The member 36 is provided with an operating extension 39 by means of which it may be moved out of holding position relative to the shaft 11.

The shaft 11 is provided with a recess 40 for receiving the end portion 41 of the member 36, said recess 40 providing a shoulder 42 on the shaft 11 for engagement by the finger 41 to hold the shaft 11 in extended or elevated position, as shown in Fig. 2, said member 41 dropping into position in the recess 40 by the action of gravity. The recess 40, as will be clear from Fig. 1, is provided with a curved lower wall portion 43 and if it is desired to move the member 36 out of the socket 40 to depress the hand wheel 15 it is necessary to actuate said member 36 by engagement with the extension or finger 39. The sleeve 10 fits closely within the openings 44 and 45 in the bracket 8 and housing 46 respectively so as to hold the pinion 47 in proper alignment with the gear 48 mounted on the shaft 49, said shaft 49 being journaled in a cross bar 50 provided on the casting of which the housing 46 is a part. Said bar has a downwardly extending yoke-like bracket member 51 thereon having a transversely extending portion 52 serving as a lower bearing member for the shaft 49, said shaft 49 having a reduced extension 53 extending into a suitable opening in the member 52 and rotatable therein. The shoulder 54 prevents the shaft 49 from dropping downwardly and an opening 55 for a cotter pin is provided for preventing upward movement of said shaft. Said shaft is round and the gear 48 is free to rotate thereon. The gear 48 is provided with a depending lug 56 to which the chain 57 is secured by any suitable means, such as the bolt 58.

It will be evident that as the gear 48 is rotated the chain 57 will be wound on the shaft 49 and the brake will be applied with a pressure corresponding to the amount of chain wound on the shaft 49. The gear 48, as will be clear, is rotated by rotation of the hand wheel 15 in either its extended or depressed position and is held in any desired position by means of the ratchet wheel 29 in the ordinary well known manner.

The lower end portion of the shaft 11 is provided with a pair of wings or lateral projections 59 formed by upsetting the metal from the portions 60 laterally. The wings or extensions 59 are adapted to enter suitable grooves 61 in the member 10, the upward movement of said shaft 11 being halted by engagement of the lugs or wings 59 with the ends of the grooves 61, thus preventing upward accidental withdrawal of the shaft.

The bar portion 50 is provided with an apertured ear 62 for receiving securing means 63 for fastening the rear portion of said member to any convenient member 64 of the car framework.

The sleeve portion 10 is provided with an annular rib 65 engaging with the inner face 66 of the housing 46, said rib being provided on the side of the pinion portion 47 on the sleeve. By providing the rib portions 65 and 22 the friction is greatly reduced as only a very small bearing surface exists between the rotating parts and bearings, it being noted that the sleeve 10 and the sleeve 14 are both spaced otherwise from the bearings. The spacing of the sleeve 10 from the surrounding parts is comparatively small so that the pinion 47 is held in proper alignment but is loose enough so that no material friction exists at these points. The friction is still further reduced and easier operation is obtained by providing the particular arrangement of winding mechanism for the chain, whereby either the shaft 49 may rotate in its bearings together with the gear 48 or the gear 48 may rotate independently of the shaft 49. A pin 67 is provided for holding the gear 48 from dropping down on the shaft 49.

By providing the winding mechanism shown, a quick take-up of the slack in the chain 57 is obtained and great braking power is obtained without the provision of a large number of extra parts and without making the chain and the lever to which the chain is secured of undesirably greater length. By mounting the end of the chain on the lug 56, which is spaced laterally from the axis of rotation from the gear, it will be seen that when the gear is given its first half turn by means of the hand wheel from the position shown in Fig. 1, the chain will be wound around the shaft 49 and will be carried past the same an equal distance on the opposite side thereof from that at which it is located in Fig. 1. This will take the slack out of the chain 57 very rapidly and further turning of the hand wheel will wind the chain around the shaft 49 to further tension the same and apply the brakes.

By providing separate bearings for the upper end of the shaft and for the lower end of the shaft, the device can be applied to end sills of different depths and of different types without difficulty, it being only necessary to make the shaft 11 of different lengths to correspond to the different end sills. It will be noted that there is nothing connecting the upper and lower bearings except the shaft and that this is, of course, slidable, the sleeve members 10 and 14 being also separated so that the upper and lower bearings can be spaced at any desired distance apart.

The winding mechanism can be applied as well to a brake that has a shaft that is not movable vertically as to the slidable shaft. Such a device is shown in Fig. 4 in which the hand wheel 15', provided on the shaft 11', is adapted to rotate the pinion 47', corresponding to the pinion 47, the shaft 11' being squared so that the pinion 47' will rotate therewith, said pinion 47' being mounted in a housing 46' and meshing with the gear 48' mounted on the shaft 49' in the same way that the gear 48 is mounted on the shaft 49 and rotates thereon, said shaft 49' being mounted in bearings in the member 50' and in the yoke 51' in the same manner as the shaft 49. The gear 48' has a lug 56' thereon corresponding to the lug 56 and a chain 57' corresponding to the chain 57 is secured thereto and may be wound about the shaft 49' by rotation of said gear 48' in the same manner as the chain 57 is wound around the shaft 49 by rotation of the gear 48.

Instead of providing the pivotally mounted member 36 for holding the shaft in elevated position, the arrangement shown in Fig. 5 may be used in which the shaft 11, mounted in the housing 34', engages at its lower end 67 with a bolt 68 provided on the member 69, said member 69 being provided with an outwardly projecting ear 70 by means of which the same may be actuated and having an inclined face 71 engaging with the inclined face 72 on the housing 34' so that said member 69 will slide by gravity into locking position. The member 69 is inserted into position by passing the same through the top of the housing 34' before the shaft 11 is inserted. Said member 69 is provided with a wide portion and a narrower portion defining the shoulder 73 and seats in a recess in the wall of the housing 34', said recess having a wider and a narrower portion defining inwardly extending lip portions 74 so that the member 69 can not pass through the narrower portion of the opening between opposite edges of the lips 74 but only the operating end 70 extends therethrough. Thus, when the shaft 11 is in position the locking member is holding the shaft in elevated position and can not be removed without withdrawal of the shaft.

Having thus described my invention, what I desire to claim and secure by United States Letters Patent is:

1. The combination with a railway car of brake mechanism comprising a shaft, a hand wheel thereon, spaced independent bearing members on said car, and a pair of spaced independent sleeves on said shaft each mounted in one of said bearing members, said shaft being slidable in said sleeves and said sleeves being rotatable with said shaft, one of said sleeves having ratchet teeth thereon and being loosely mounted in its bearing member, said sleeve having a depending rib engaging said bearing.

2. The combination with a railway car of brake mechanism comprising a shaft, a hand wheel thereon, spaced independent bearing members on said car, and a pair of spaced independent sleeves on said shaft each mounted in one of said bearing members, said shaft being slidable in said sleeves and said sleeves being rotatable with said shaft, said sleeves having depending ribs engaging said bearings.

3. The combination with a railway car of brake mechanism comprising a freely rotatable shaft, a freely rotatable gear thereon, means for rotating said gear, a lug depending therefrom, a chain and means for securing a link of said chain to said lug so as to project radially outwardly therefrom, said chain being mounted so as to be carried around said shaft without rotating the same upon initial rotation of said gear and binding on said shaft to rotate the same upon continued rotation of said gear to wind said chain on said shaft.

4. The combination with a railway car of brake mechanism comprising a rotatable shaft, a gear carried by said shaft, a pinion for rotating said gear, a lug depending from said gear, a chain, and means for securing a link of said chain to said lug so as to project radially outwardly therefrom, said chain being mounted so as to be wound upon said shaft after initial rotation of said gear.

In witness whereof, I hereunto subscribe my name this 18th day of September A. D., 1923.

ARTHUR F. O'CONNOR.